United States Patent [19]

Hegemann

[11] 4,145,193

[45] Mar. 20, 1979

[54] APPARATUS FOR CLEANING STACK GAS AND USING SAME FOR GENERATION OF ELECTRIC POWER

[75] Inventor: Karl R. Hegemann, Essen-Bergerhausen, Fed. Rep. of Germany

[73] Assignee: Gottfried Bischoff Bau Kompl. Gasreinigungsund Wasserrückkühlanlagen Kommanditgesellschaft, Essen, Fed. Rep. of Germany

[21] Appl. No.: 818,675

[22] Filed: Jul. 25, 1977

Related U.S. Application Data

[63] Continuation-in-part of Ser. No. 692,731, Jun. 4, 1976, Pat. No. 4,055,331, and a continuation-in-part of Ser. No. 520,920, Nov. 4, 1974, Pat. No. 4,007,025.

[30] Foreign Application Priority Data

| Nov. 6, 1973 [DE] | Fed. Rep. of Germany | 2355457 |
| Aug. 20, 1974 [DE] | Fed. Rep. of Germany | 2439757 |
| Aug. 20, 1974 [DE] | Fed. Rep. of Germany | 2439758 |

[51] Int. Cl.² .......................................... B01D 47/10
[52] U.S. Cl. ..................................... 55/210; 266/147; 266/157; 266/159; 266/89; 55/226; 55/385 D; 261/DIG. 56
[58] Field of Search .................. 55/21, 93, 94, 210, 55/213, 223, 238, 257 R, 258, 385 R, 358 D, 418, 226; 261/23 R, 62, DIG. 54, DIG. 56; 60/39.09 D, 39.5, 39.59; 266/44, 89, 147, 157, 159

[56] References Cited

U.S. PATENT DOCUMENTS

| 3,559,970 | 2/1971 | Hamabe et al. | 55/210 |
| 3,844,745 | 10/1974 | Hegemann et al. | 55/213 |
| 4,007,025 | 2/1977 | Hegemann | 55/213 |
| 4,052,042 | 10/1977 | Hegemann et al. | 55/213 |
| 4,055,331 | 10/1977 | Hegemann | 55/213 |

FOREIGN PATENT DOCUMENTS

| 2605288 | 8/1976 | Fed. Rep. of Germany | 266/89 |
| 2631977 | 1/1977 | Fed. Rep. of Germany | 266/44 |
| 15241 | 4/1971 | Japan | 55/210 |

*Primary Examiner*—Frank W. Lutter
*Assistant Examiner*—David L. Lacey
*Attorney, Agent, or Firm*—Karl F. Ross

[57] ABSTRACT

Stack gas is first passed through a coarse-particle separator and then a prescrubbing tower. Then this gas, which is under pressure, is passed through a pair of differential-pressure (annular-gap) washers. The output side of one of the washers is connected directly to a droplet separator at the output of the system. The outlet of the other washer is connected through a turbine driving an electric generator and having its output side in turn connected to the droplet separator. The control body of at least the washer which is connected directly to the droplet separator is adjustable so as to maintain a constant backpressure in the system at the blast furnace from which the stack gas comes. The washer connected to the turbine is set up to pass at least four times as much of the gas as the other washers so that most of the gas passes through the turbine, undergoing a pressure drop that is transformed into the work of driving the turbine and generates electricity.

5 Claims, 5 Drawing Figures

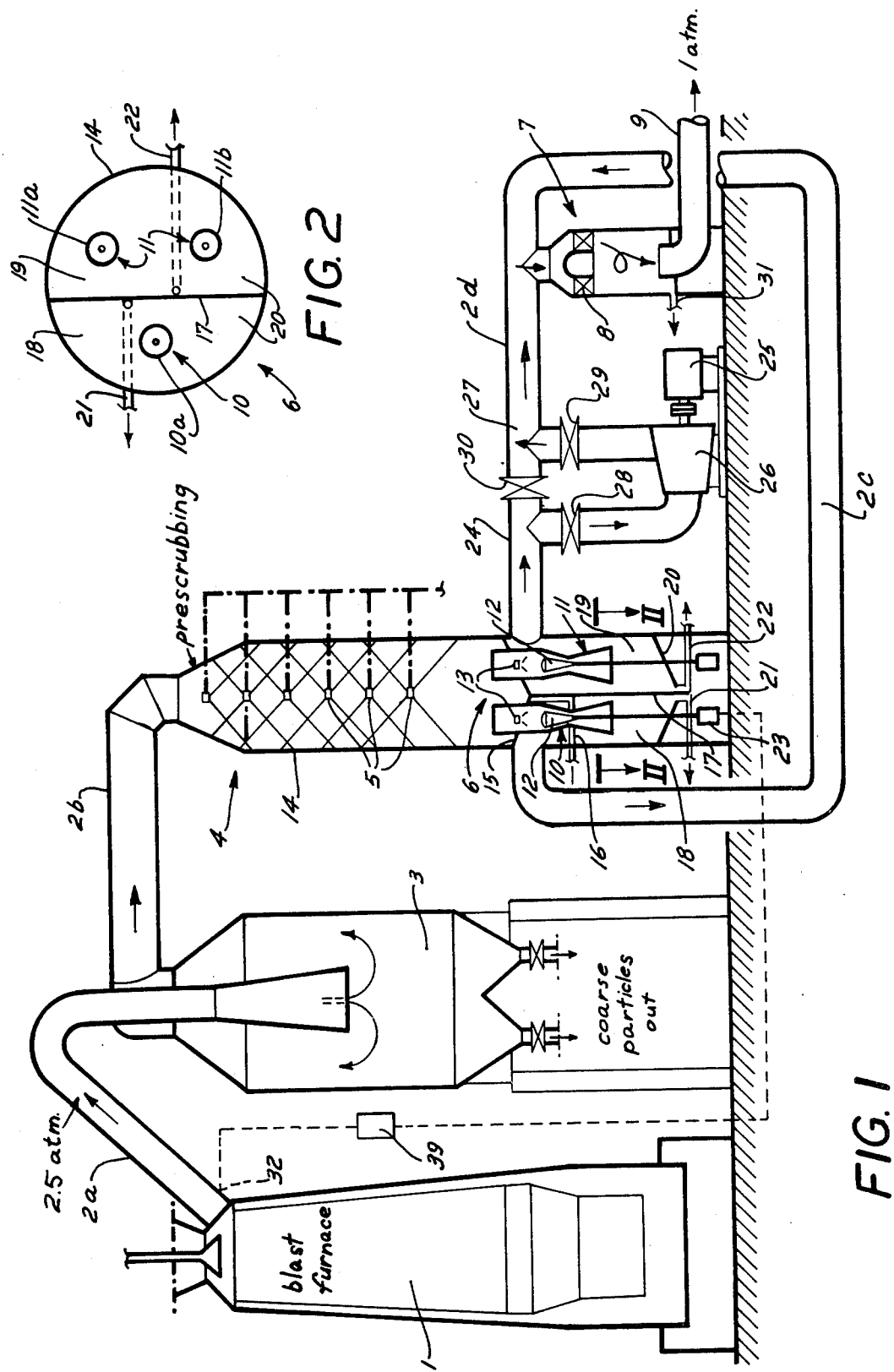

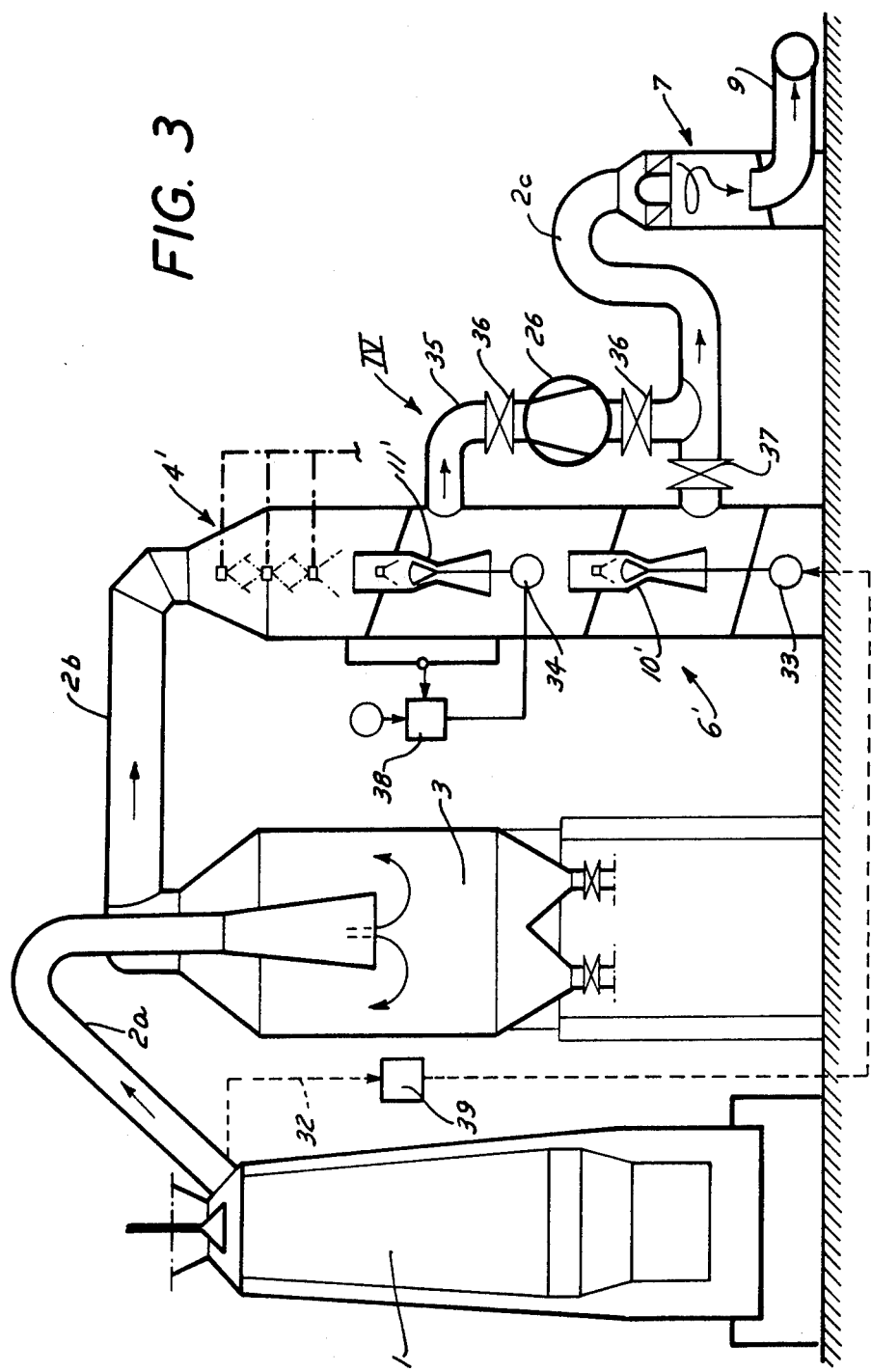

APPARATUS FOR CLEANING STACK GAS AND USING SAME FOR GENERATION OF ELECTRIC POWER

CROSS REFERENCE TO RELATED APPLICATION

This application is a continuation-in-part of Ser. No. 692,731 filed June 4, 1976 (U.S. Pat. No. 4,055,331) as a continuation-in-part of Ser. No. 520,920 filed Nov. 4, 1974 (U.S. Pat. No. 4,007,025) and is related to commonly assigned and then pending application Ser. No. 345,762 filed March 28, 1973 (U.S. Pat. No. 3,854,908 issued Dec. 17, 1974) as a continuation-in-part of application Ser. No. 235,208 filed Mar. 15, 1972 (U.S. Pat. No. 3,844,744) citing application Ser. No. 188,557 filed Oct. 12, 1971 (U.S. Pat. No. 3,726,065).

FIELD OF THE INVENTION

The present invention relates to apparatus for treating pressurized stack gas. More particularly this invention concerns the treatment of such gases issuing from high-pressure blast furnaces and the like.

BACKGROUND OF THE INVENTION

Hot stack gases which issue from a blast furnace or the like at a pressure of several atmospheres are usually passed through a cleaning or purifying device which first separates out the larger particles carried by the gas and then subjects the gas to a scrubbing operation which removes many of the water-soluble gas components and removes additional particles from the gas stream.

The above-cited earlier works describe so called Venturi or differential-pressure (annular-gap) washers which comprise a tube having a narrow waist in which is received a body that is displaceable within this tube so as to define a variable gap therewith. A sprayer is provided in the upstream end of the tube so that the turbulence and pressure drop in the tube will thoroughly scrub the remaining particles from the gas.

Such differential-pressure (annular-gap) washers are used to maintain a constant backpressure in the blast furnace. A constant backpressure is necessary for proper functioning of the furnace and can readily be maintained by the washers. At the same time such devices serve to drop the pressure so that the cleaned stack gases can be used in regenerators for heating up the charge or the air that goes into the furnace. As a rule a plurality of such annular-gap washers are used with all of their insert bodies coupled together so as to permit adjustment of the pressure drop across them to maintain the pressure in the blast furnace constant.

Such systems are relatively effective. However they have the principal disadvantage that they waste a considerable amount of energy present in the hot pressurized stack gas. A significant amount of energy available to do work is wasted as the gases pass through the washers and expand.

OBJECTS OF THE INVENTION

It is therefore an object of the present invention to provide an improved apparatus for cleaning stack gas.

Another object of this invention is to provide a stack-gas cleaning apparatus which recovers at least a portion of the energy present in the stack gas.

Yet another object is the provision of an apparatus which allows the pressure in the blast furnace to be maintained constant for most efficient blast-furnace operation.

SUMMARY OF THE INVENTION

These objects are attained according to the present invention in an apparatus for cleaning stack gas from a high-pressure blast furnace or the like which uses a pair of differential-pressure (annular-gap) washers connected either in parallel or in series with one another in the gas path from the prescrubber. The output side of one of these washers is connected directly to the discharge end of the system and the output side of the other washer is connected through a turbine to this discharge end. The central body of the first-mentioned washer, that is the one not connected to the turbine, is adjusted automatically in response to the pressure in the system at the blast furnace thus the annular gap between the body of this washer and its tube is adjusted so as to control the back-pressure of this blast furnace.

In accordance with another feature of this invention the turbine is used to drive a load, a generator being particularly suitable. In this manner it is possible to generate electricity with energy that would otherwise be completely wasted in the system. The turbine according to this invention is a so-called expansion turbine wherein a vapor admitted on one side expands in the turbine and drives its rotor.

The invention is based on the surprising fact that it is possible to regulate the pressure at the input end of the system to a very fine degree by controlling only a portion of the gas stream through the system. In accordance with the present invention the variable-gap washer is set up for a much higher pressure drop than the other washer that is connected to the turbine. Thus in accordance with this invention the quantity of air per unit of time passing through the variable Venturi and the other Venturi forms a ratio of between 1:3 and 1:5, i.e. 3 to 5 parts by volume per unit time of gas traverses the turbine-feeding Venturi per part of gas traversing the controlled Venturi. This is achieved in accordance with a feature of this invention by providing a single variable-gap washer and a pair of annular-gap washers connected to the turbine. In accordance with a further feature of this invention the second annular-gap washers connected to the turbine are also adjustable for adjustment of the system such that the turbine runs at maximum efficiency.

Thus in accordance with the present invention the two washers or the two sets of washers can be provided on a single horizontal partition wall provided in a scrubbing tower. The chamber below the partition wall is subdivided by a further partition into a pair of compartments, one of which is connected to the system output while the other compartment is connected to the turbine input.

According to yet another feature of this invention a shunt conduit is provided between the input and output sides of the turbine; valves are provided at the input and output sides of the turbine and in this shunt conduit so that it is possible to close the valve in the shunt conduit during normal operation of the turbine and to open this valve in the shunt conduit and close the other two valves to allow servicing and, indeed, removal of the turbine during continued operation of the system.

The two annular-gap washers or sets of washers in accordance with yet another feature of this invention can be provided one behind the other. The variable-gap wahser is provided downstream of that washer whose output is connected in this case both to the input of the turbine and to the input of the second washer. According to the present invention the first washer is set up so that it can pass 100% of the stack gas whereas the second one can only pass a maximum of 20% of this gas.

In accordance with the present invention the turbine is so set up that it has a supplementary gas-cleaning effect that allows the formation of ice crystals in this turbine to be completely avoided. Thus the prescrubber and the first annular-gap washer is operated such that the stack gas is almost completely saturated with water vapor. This saturated gas is fed to an expansion turbine that is a one-stage or multistage centripetal turbine with a centrifugal separator housing and whose condensation effect is such that the heat of condensation maintains the fluid state of the condensate. This saturation of the stack gas in no way adversely affects the pressure regulation at the head of the blast furnace or the like. As long as the level of water vapor in the stack gas approaches the saturation level the heat of condensation will ensure that under all operating conditions no ice crystals form. Even though this saturation does decrease slightly the efficiency of the Venturi washers, this slight loss is more than compensated by the advantage of an additional separating function in the expansion turbine where the considerable condensation not only prevents ice-crystal formation but increases separation of particles from the gas. It is also possible within the scope of this invention to inject water into the expansion turbine.

The system according to the present invention not only serves to drop the pressure of and clean stack gases from a blast furnace or the like but also is able to maintain the pressure of the gas within this furnace substantially constant. At the same time the normally wasted energy of this stack gas is employed to generate electricity.

BRIEF DESCRIPTION OF THE DRAWING

The above and other objects, features, and advantages of the present invention will become more readily apparent from the following description, reference being made to the accompanying drawing in which:

FIG. 1 is a vertical sectional view partly in diagrammatic form illustrating a system according to the present invention;

FIG. 2 is a section taken along line II—II of FIG. 1, drawn to an enlarged scale;

FIG. 3 is a view similar to FIG. 1 illustrating another system in accordance with this invention;

SPECIFIC DESCRIPTION

Figure 4:
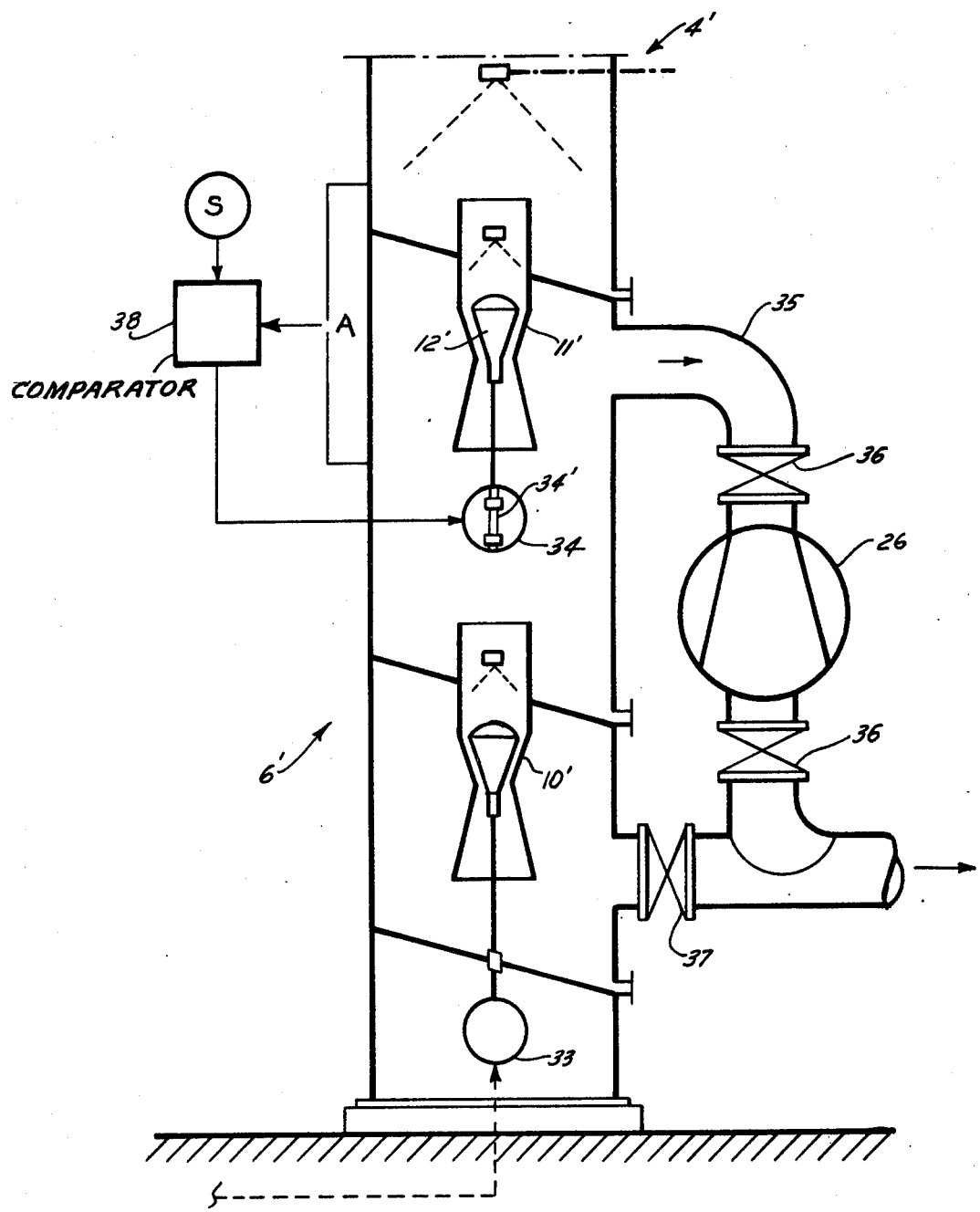
FIG. 4 is a large-scale view of the detail indicated by arrow IV of FIG. 3.

As shown in FIGS. 1 and 2 an apparatus for cleaning stack gas coming from a blast furnace 1 has a conduit whose extreme upstream section 2a leads from the cupola of the furnace to a coarse-particle separator 3. Another conduit section 2b leads from this particle separator 3 to a prescrubber 4 having a plurality of spray heads 5 that discharge water sprays which, by washing, serve further to remove particles from the stack gas. The thus partially purified gas then passes through a set 6 of annular-gap washers from which the gas passes through conduit sections 2c and 2d to a final droplet separator 7 having angled vanes 8. The latter separator 7 removes all of the liquid from the gas before it is pulled away in a clean-gas output conduit 9. The pressure in the conduit section 2a is between 2 and 3 atmospheres and that in conduit 9 at the output of the system is approximately 1 atmosphere.

The set 6 of annular-gap washers comprises a plurality of Venturi-type pressure-drop washers 10 and 11 as shown in FIG. 2 having respective tubes or sleeves 10a, 11a and 11b within each of which is displaceable a central body 12. Spray heads 13 are provided in the tubes 10a, 11a and 11b above the bodies 12 in a manner substantially as described in the above-cited patents.

The prescrubber 4 and the pressure-drop washer arrangement 6 are provided in a single upright tower 14 in which the stack gas passes from top to bottom. An upwardly concave conical horizontal partition wall 15 is provided in the tower 14 with the annular-gap washers 10 and 11 passing vertically through this wall 15. Water collected by this wall 15 is drawn off through a conduit 16. Thus the wall 15 divides the tower 14 into an upper chamber and a lower chamber. An upright partition wall 17 divides the chamber below the partition wall into a pair of compartments 18 and 19, the single annular-gap washer 10 opening into the compartment 18 and the two washers 11 into the compartment 19. The lower ends of these compartments are sealed by a single conical wall 20 in which are provided separate outlet conduits 21 and 22 for carrying off water.

A conduit section 2c is connected to the upper region of the chamber 18 and feeds the gas therefrom to the upper end of the droplet separator 7. A similar conduit 24 is connected to the upper end of the chamber 19 and is connected through a valve 28 to the inlet of an expansion turbine 26 whose outlet side is connected through a valve 29 to a conduit section 2d also connnected to the drop separator 7. A shunt conduit section 27 is connected across the two valves 28 and 29 to the opposite sides of the turbine 26 and is provided with a shunt-off valve 30 that is normally closed. Water is drawn out of the droplet separator 7 at an outlet nipple 31. The valves 28 and 29 can be closed and the valve 30 opened to allow servicing and/or removal of the turbine 26 without impairing gas flow through the system according to this invention.

The central body 12 of the annular-gap washer 10 is vertically displaceable by a servomotor 23 operated by a controller 39 connected to a sensor 32 at the extreme upstream end of the conduit 2a–2d. When the pressure at the sensor 32 drops below a predetermined level the body 12 of the washer 10 is moved downwardly to decrease the annular gap between it and the sleeve 10a and thereby increase the back pressure across this washer 10. Inversely when the pressure increases above a predetermined level as dictated by the sensor 32 the body 12 is lifted so as to decrease the back pressure across this washer 10 and thereby maintain a generally constant pressure in the blast furnace 1.

The pressure-drop washers 10 and 11 are so dimensioned that once the furnace 1 is operating at normal speed approximately four times more stack gas passes through the washers 11 than through the washer 10. An installation as shown in FIG. 1 is used with stack gas at an original pressure of 15,000 mm water column with 20% of this stack gas passing through the washer 10 so as to reduce the pressure by 14,000 mm water column to a pressure of 1,000 mm water column. The remaining 80% of the stack gas is fed through the second washers 11 which reduce the pressure only by 3,000 mm water column so that the gas is fed to the turbine 26 with a pressure 12,000 mm water column. This turbine 26 drops the pressure of 11,000 mm water column so that at the drop separator 7 the gas has a pressure of 1,000 mm water column. Considerable work is created by the turbine in this manner.

As the blast furnace 1 is started up the expansion turbine 26 is cut out by closing the valves 28 and 29 and opening the valve 30. Simultaneously the washers 10 and 11 are so adjusted that the various separators and scrubbing devices work at maximum efficiency. This can be effected by another control circuit similar to the control circuit 32. Once the blast furnace 1 is at regular operating condition the control apparatus 32 proceeds to function and the washers 11 are set for maximum cleaning efficiency and maximum operating efficiency of the expansion turbine and the generator 25. The valves 28 and 29 are then opened and the valve 30 closed. The control body 12 of the washer 10 is then adjusted so as to maintain necessary back-pressure at the sensor 32.

In the arrangement shown in FIGS. 3 and 4 the numerals of FIGS. 1 and 2 are used wherever the structure is identical. In this arrangement the tower 4' is provided with a pair of series-connected washers 11' and 10' constituting a stepped pressure-drop washer assembly 6'.

The downstream annular-gap washer 10' is provided with a servomotor 33 connected to the control 39 so as to allow adjustment of the annular gap in this washer 10', thereby changing the back pressure created thereby. A bypass conduit 35 in which an expension turbine 26 is provided has a pair of cutoff valves 36 which allow the turbine 26 to be cut completely out of the circuit. This bypass conduit 35 opens at its upstream and into the chamber at the downstream side of the washer 11'. A valve 37 is provided in the conduit 2c into which the bypass conduit opens downstream of the turbine 26 at the outlet side of the washer 10'.

The control body 12' of the washer 11' is provided with a servomotor 34 connected to a control system (comparator) 38 which pneumatically displaces this control body 2, vertically by means of a cylinder illustrated schematically at 34' in FIG. 4. The upper pressure-drop washer 11' is capable of passing 100% of the stack gas whereas the downstream washer 10' can only pass at a maximum 20% of the stack gas flowing through the conduit sections 2a, 2b, 2c. The comparator 38 receives a set-point signal S and an actual valve signal A representing the pressure differential across the upstream differential-pressure washing device 11'.

The comparator 38 receives a set-point signal S and an actual value signal A representing the pressure differential across the upstream differential-pressure washing device 11.

Figure 5:
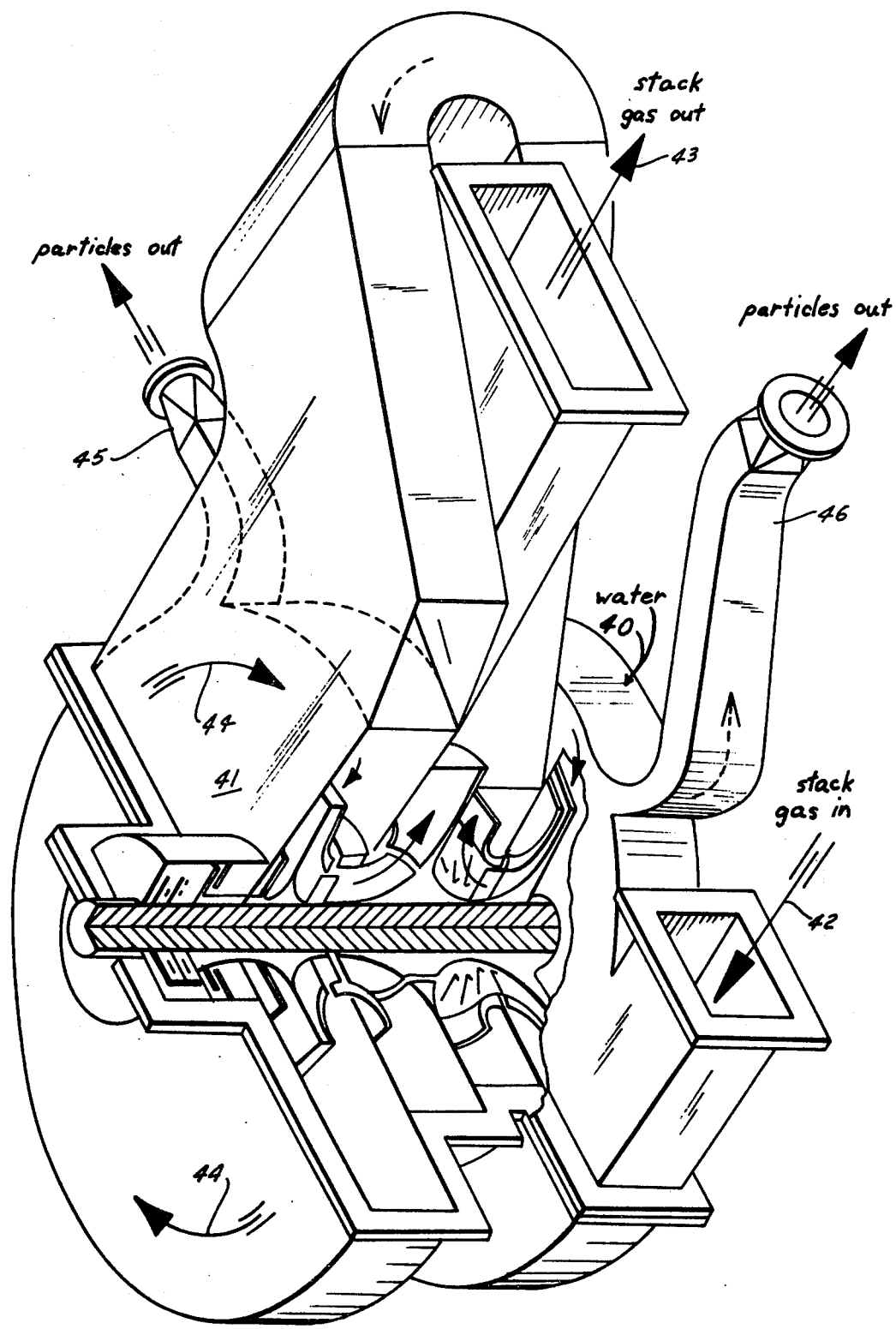
FIG. 5 is a perspective view partly in section illustrating a turbine-separator according to the present invention.

FIG. 5 shows the two-stage expansion turbine 26 according to the present invention. This turbine has a centripetal separator housing 41. A gas enters as shown by arrows 42 and leaves as shown by arrows 43. Arrows 44 indicate how the centripetal separator housing 41 is shaped substantially as a spiral. Condensate with the dust carried therewith leaves the housing 41 at the outlets 45 and 46. With such a turbine 26 the prescrubber and the pressure-drop arrangement 11 is set such that the gas is virtually saturated with water vapor so that the turbine 26 operates with a condensation effect that is so adjusted that the heat of condensation maintains the condensate fluid. In addition the expansion turbine 26 can be provided as indicated by arrow 40 with an arrangement for introducing water to its interior. Thus the expansion in this turbine 26 functions without formation of ice crystals.

We claim:

1. A gas-cleaning apparatus for a pressure blast furnace having a waste-gas duct connected to said furnace, said apparatus comprising:
   a prewasher having a gas inlet and a gas outlet, said inlet of said prewasher being connected to and receiving gas from said duct, said prewasher prescrubbing waste gas from said duct;
   an upstream differential-pressure washer connected to said outlet of said prewasher, said upstream differential-pressure washer comprising a tube member, a control member in said tube member defining a variable gap traversed by gas passing through said upstream differential-pressure washer, and comparator means responsive to the pressure differential across said gap and connected to said control member of said upstream differential-pressure washer for controlling the displacement thereof, said upstream differential-pressure washer having an outlet;
   a downstream differential-pressure washer connected to the outlet of said upstream differential-pressure washer and comprising a tubular member traversed by gas passing through said downstream differential-pressure washer, a displaceable control member in said tube member of said downstream differential-pressure washer and defining a variable gap therewith traversed by gas, and control means connected to sensor means in said waste gas duct and responsive to the gas pressure in said furnace for shifting said displaceable control member of said downstream differential-pressure washer, said downstream differential-pressure washer having an outlet;
   an expansion turbine having a gas inlet connected to the outlet of said upstream differential-pressure washer and an outlet connected to the outlet of said downstream differential-pressure washer;
   a control valve connected in series with said turbine; and
   a droplet separator connected to the outlet of said turbine and the outlet of said downstream differential-pressure washer.

2. The apparatus defined in claim 1 wherein said comparator means comprises means for applying a set-point value signal to said comparator means; and
   means for applying an actual-value signal to said comparator means representing the pressure differential across the gap of said upstream differential-pressure washer.

3. The apparatus defined in claim 1 wherein said prewasher includes a tower provided with spray means in an upper portion thereof, the tube member of said upstream differential-pressure washer being disposed below said spray means in said tower so that gas traversing said upstream differential pressure washer is substantially completely saturated with water vapor, said expansion turbine comprising a centripetal turbine having at least one stage and a centrifugal screening housing.

4. The apparatus defined in claim 1, further comprising a coarse-particle separator connected between said duct and said prewasher.

5. The apparatus defined in claim 1 wherein said prewasher and both of said differential-pressure washers are disposed in a common upright column with said prewasher beind disposed above said upstream differential-pressure washer and said downstream differential-pressure washer is disposed below said upstream washer.

* * * * *